United States Patent
Lin et al.

(10) Patent No.: US 12,009,912 B2
(45) Date of Patent: Jun. 11, 2024

(54) WDM CHANNEL REASSIGNMENT

(71) Applicant: Taiwan Semiconductor Manufacturing Company, Ltd., Hsinchu (TW)

(72) Inventors: Chih-Chang Lin, San Jose, CA (US); Chan-Hong Chern, Palo Alto, CA (US); Stefan Rusu, Sunnyvale, CA (US); Weiwei Song, San Jose, CA (US); Lan-Chou Cho, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 116 days.

(21) Appl. No.: 17/888,947

(22) Filed: Aug. 16, 2022

(65) Prior Publication Data

US 2023/0308206 A1     Sep. 28, 2023

Related U.S. Application Data

(60) Provisional application No. 63/322,759, filed on Mar. 23, 2022.

(51) Int. Cl.
*H04J 14/02*     (2006.01)
*H04B 10/50*    (2013.01)

(52) U.S. Cl.
CPC ........ *H04J 14/0283* (2013.01); *H04B 10/506* (2013.01); *H04J 14/0221* (2013.01)

(58) Field of Classification Search
None
See application file for complete search history.

(56) References Cited

U.S. PATENT DOCUMENTS

8,768,170 B2 *  7/2014  Krishnamoorthy ............ G02B 6/29395
                                                                        398/91
9,182,647 B2 *  11/2015  Akiyama ............ G02B 6/2938
(Continued)

FOREIGN PATENT DOCUMENTS

EP       3271773 B1 *   4/2022   .......... G02F 1/0121

OTHER PUBLICATIONS

Wim Bogaerts et al., Silicon microring resonators, Laser Photonics Rev. 6, No. 1, 47-73 (2012).
(Continued)

*Primary Examiner* — Jai M Lee
(74) *Attorney, Agent, or Firm* — Haynes and Boone, LLP

(57) ABSTRACT

An optical device includes a first waveguide, ring-shaped waveguides adjacent to the first waveguide, and heaters coupled to the ring-shaped waveguides in one-to-one correspondence. A method includes coupling a first light source with a first wavelength to the first waveguide, increasing electric current through the heaters until a first one of the ring-shaped waveguides resonates, assigning the first one of the ring-shaped waveguides to the first wavelength, resetting the electric current through the heaters to the initial electric current, coupling a second light source with a second wavelength to the first waveguide wherein the second wavelength is different from the first wavelength, increasing the electric current through the heaters until a second one of the ring-shaped waveguides resonates wherein the second one of the ring-shaped waveguides is different from the first one of the ring-shaped waveguides, and assigning the second one of the ring-shaped waveguides to the second wavelength.

20 Claims, 8 Drawing Sheets

(56) References Cited

U.S. PATENT DOCUMENTS

| | | | | |
|---|---|---|---|---|
| 9,348,154 | B2* | 5/2016 | Hayakawa | G02F 1/225 |
| 9,513,531 | B1* | 12/2016 | Akiyama | G02B 6/29338 |
| 9,537,289 | B1* | 1/2017 | Akiyama | H01S 5/142 |
| 9,606,417 | B2* | 3/2017 | Hayakawa | H04B 10/516 |
| 9,705,282 | B2* | 7/2017 | Takabayashi | H01S 5/1096 |
| 10,082,685 | B2* | 9/2018 | Guzzon | G02F 1/0147 |
| 10,126,506 | B2* | 11/2018 | Mower | H04L 9/0858 |
| 10,651,933 | B1* | 5/2020 | Chiang | H04B 10/0795 |
| 11,139,907 | B2* | 10/2021 | Melikyan | H04B 10/506 |
| 2004/0081386 | A1* | 4/2004 | Morse | G02F 1/3133 |
| | | | | 385/3 |
| 2006/0222038 | A1* | 10/2006 | Yamazaki | H01S 5/1032 |
| | | | | 372/94 |
| 2013/0044973 | A1* | 2/2013 | Akiyama | G02F 1/0121 |
| | | | | 385/2 |
| 2020/0371385 | A1 | 11/2020 | Amiralizadeh et al. | |
| 2020/0409001 | A1 | 12/2020 | Liang et al. | |
| 2021/0006044 | A1 | 1/2021 | Hong et al. | |
| 2023/0179305 | A1* | 6/2023 | Sysak | H04B 10/506 |
| | | | | 398/135 |

OTHER PUBLICATIONS

Po Dong et al., Wavelength-tunable silicon microring modulator, Optics Express vol. 18, No. 11, May 10, 2010, 10941-10946.

Yangjin Ma et al., Silicon Microring Based Modulator and Filter for High Speed Transmitters at 1310 nm, 2014 IEEE Optical Interconnects Conference, pp. 23-24.

* cited by examiner

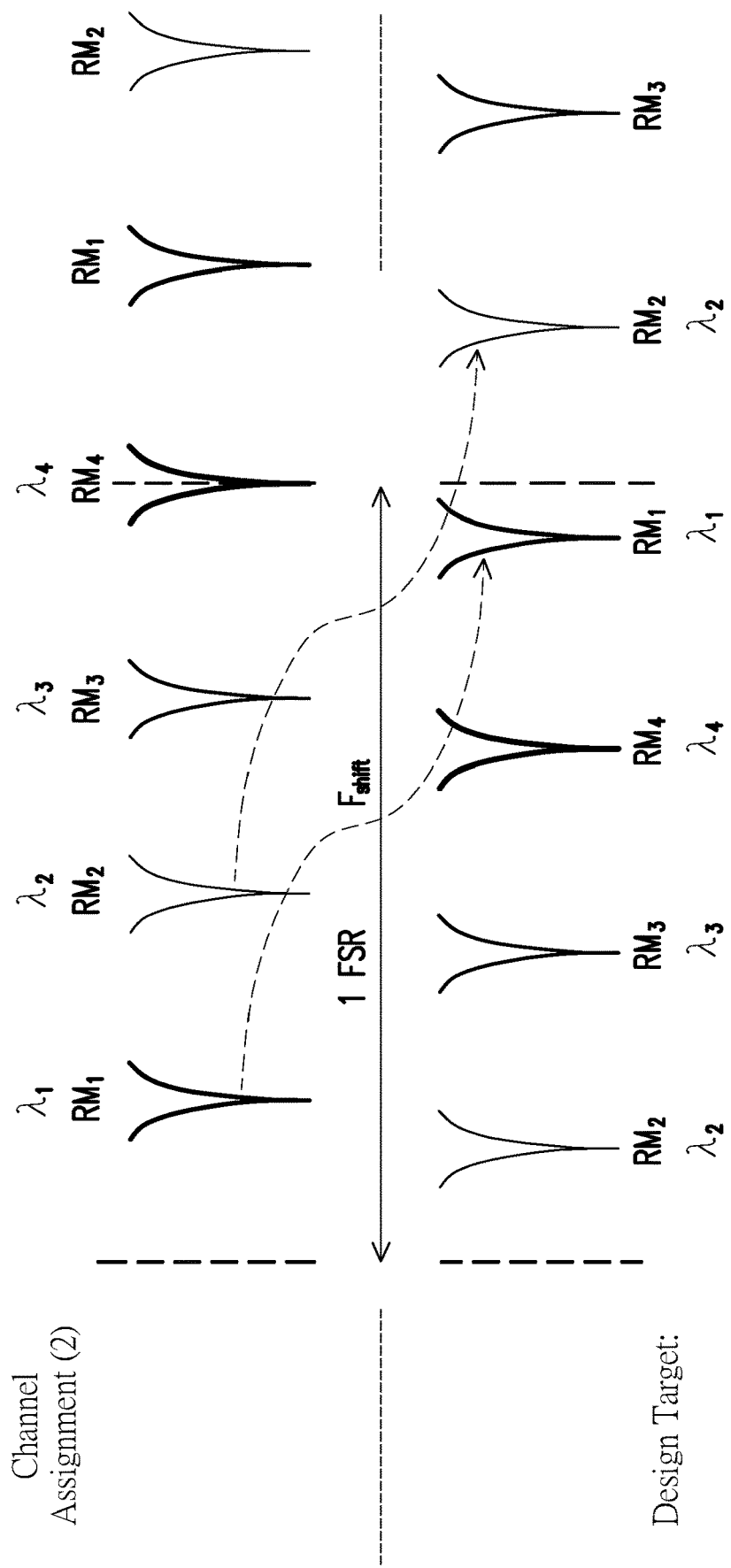

WDM CHANNEL REASSIGNMENT

PRIORITY

This application claims the benefits of U.S. Prov. App. Ser. No. 63/322,759, filed Mar. 23, 2022, the entire disclosure of which is incorporated herein by reference.

BACKGROUND

MRM (Micro-Ring Modulator or Microring Modulator or Micro Ring Modulator) is very promising for providing high data rate, ultra-low power consumption, and small footprint (or size) for wavelength division multiplexing (WDM) including dense WDM (DWDM). DWDM using multiple MRMs for different channels can further scale up the data rates. Improvements in certain areas of DWDM implementations are desired, for example, to control the resonance frequencies of MRMs reliably and efficiently in a DWDM system.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only except explicitly disclosed. In fact, the dimensions of the various features may be arbitrarily increased or reduced for clarity of discussion.

FIG. 9 illustrates a channel assignment for comparison with the example channel assignment in FIG. 8 to illustrate advantages of the disclosed dynamic channel assignment.

DETAILED DESCRIPTION

Figure 1:
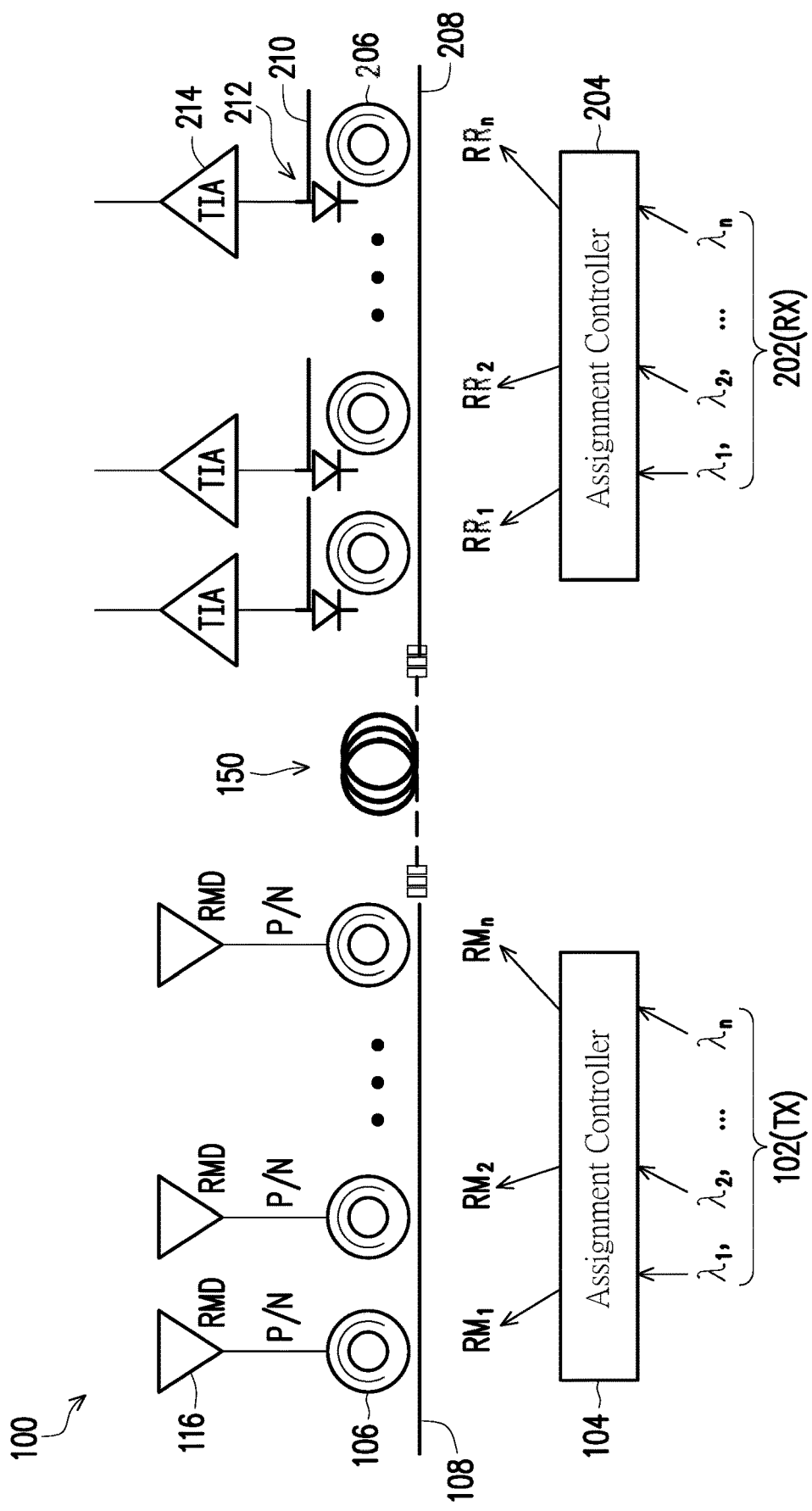
FIG. 1 illustrates a simplified diagram of an optical system with dynamic channel assignment according to embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.25 nm to 5.75 nm where manufacturing tolerances associated with depositing the material layer are known to be +/−15% by one of ordinary skill in the art.

The present disclosure relates to optical systems (such as optical data communication systems) and methods of operating optical systems. Particularly, the present disclosure relates to methods and systems that use MRMs in an optical transmitter for multiplexing different wavelengths and use ring resonators (RRs) in an optical receiver for demultiplexing different wavelengths. For simplicity, the present disclosure uses ring modulator (RM) and MRM interchangeably to refer to a modulator having a ring-shaped waveguide with a diameter in the micrometer range.

Optical data communication systems operate by modulating laser light to encode digital data patterns. The modulated laser light is transmitted through an optical data network from a sending node (e.g., an optical transmitter) to a receiving node (e.g., an optical receiver). The modulated laser light having arrived at the receiving node is demodulated to obtain the original digital data patterns. Therefore, implementation and operation of optical data communication systems depend on having reliable and efficient mechanisms for transmitting laser light and detecting laser light at different nodes within the optical data network.

Wavelength division multiplexing (WDM) is widely used to communicate modulated data at different carrier wavelengths on a common optical waveguide. WDM can overcome optical-fiber congestion, which is a potential problem in optical modules that include parallel optical transceivers with one channel per optical fiber. Particularly, by reducing the number of optical fibers per optical module, WDM multiplexing can simplify optical modules, thereby reducing their cost and size.

In dense WDM (DWDM), a narrow spacing between adjacent wavelengths is used. This is typically achieved by modulating data directly onto a highly stable optical carrier and then combining multiple carriers in an optical fiber. DWDM allows a large number of channels to be accommodated within a given wavelength band, and thus offers high performance. In DWDM, a variety of optical devices are used, including modulators, multiplexers (such as add filters), de-multiplexers (such as drop filters), and switches. In order to compensate for fabrication variation, temperature variation, and/or laser wavelength drift, these optical devices are typically phase-tuned to a particular wavelength for a given channel. Depending on the system requirements, a tuning range of at least 180° may be needed.

Ring modulators (including MRMs) are very promising to provide high data rates and ultra-low power and size. A DWDM system using multiple RMs for different channels in an optical transmitter can further scale up the data rate. Conversely, such DWDM system may use multiple ring resonators (RRs) for different channels in an optical receiver.

Because of process variations and different operating environment, RMs and RRs usually do not resonate at their target frequencies (or designed frequencies) during operation in an optical system. One way to correct them is to place a heater (such as a metal heater or a silicon heater) adjacent to the ring waveguide in the RMs or RRs and use the heater to move the resonance frequency to the target frequency.

In some approaches, the heaters are designed to fully cover one free spectral range (FSR) on the spectrum in a DWDM system. In such approaches, the worst condition occurs when the frequency shift of an RM or RR is one FSR. In some instances, to cover one FSR, the required temperature increase may be unrealistic. For example, one FSR for a 5-μm RM or RR may be 14 nm and one FSR for a 10-μm RM or RR may be 7 nm. If a heater needs to cover one FSR for both cases and the heating efficiency is around 70 pm/K (meaning the spectrum will shift by 70 pm with a temperature increase of 1 degree), the required temperature increase will be equal to FSR/(70 pm/K), which is 200 K for a 5-μm RM or RR and 100 K for a 10-μm RM or RR. To increase the temperature by 200 K is almost impossible or impractical in a DWDM system. Further, considering that a DWDM system may operate with an ambient temperature of 100° C. (~370 K) already, it would likely cause significant reliability issues if increasing the temperature of an RM or RR by another 100 K.

Embodiments of the present disclosure significantly reduce the power consumption of such heaters by assigning and re-assigning different wavelengths to different MRMs and/or RRs in a DWDM system. The assignment and re-assignment occur during the initialization procedure of the DWDM system, for example, every time after the DWDM system is powered up. In some cases, an RM (or RR) may be assigned to different channels during different initialization procedures of the DWDM system. In an embodiment, an RM or RR is assigned to a channel with a wavelength that is smaller than a designed wavelength of the RM or RR. As such, the required frequency shift is reduced, power consumption of heating is reduced, and the final operating temperature is also reduced.

FIG. 1 illustrates a simplified schematic diagram of an optical system 100 constructed according to embodiments of the present disclosure. The optical system 100 may be a WDM system or a DWDM system. The optical system 100 includes an optical transmitter 102, an optical receiver 202, and optical fiber 150 (and/or other transmission media) coupled between the optical transmitter 102 and the optical receiver 202. The optical system 100 may include other components not illustrated in FIG. 1.

The optical transmitter 102 includes light sources (such as lasers) (not shown) that emit light at wavelengths $\lambda_1$, $\lambda_2$, ... $\lambda_n$, respectively, where n is the number of channels in a DWDM scheme implemented in the optical system 100. These wavelengths of light are multiplexed and transmitted through a waveguide 108. As they pass through the waveguide 108, these wavelengths of light are modulated by RMs 106 (including $RM_1$, $RM_2$, ... $RM_n$) by way of resonance, which is briefly explained below.

Figure 2:
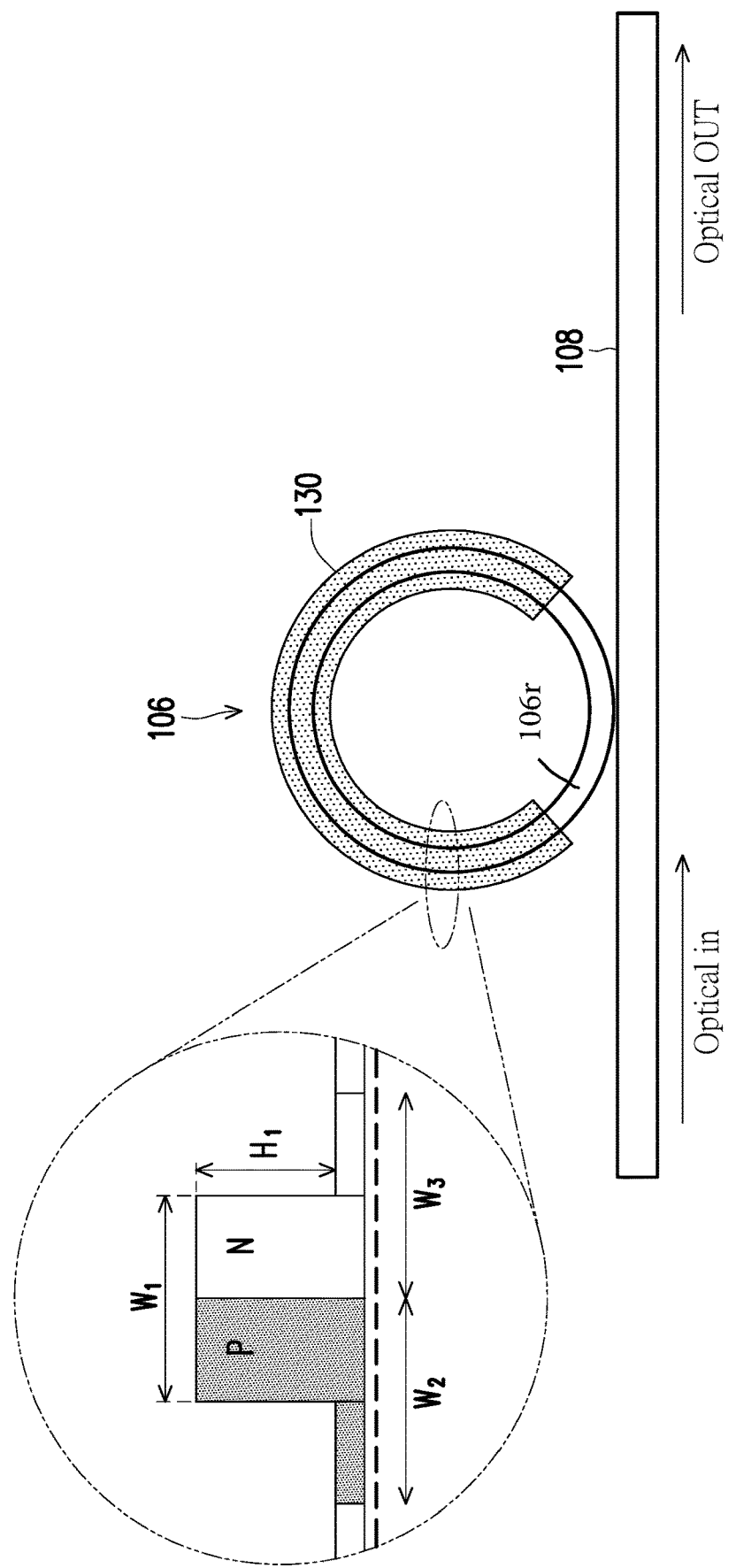
FIG. 2 illustrates a simplified diagram of an MRM used in the optical system in FIG. 1, according to embodiments of the present disclosure.

Each RM 106 includes a ring waveguide (or ring-shaped waveguide) 106r, such as shown in FIG. 2. The ring waveguide 106r is placed adjacent to and spaced from the waveguide 108 which carries multiple wavelengths of light. The ring waveguide 106r resonates when the following equation, EQ-1, is satisfied.

$$2\pi n_{eff} R = m_1 \lambda \quad \text{(EQ-1)}$$

In the equation EQ-1, "$n_{eff}$" is the effective refractive index of the ring waveguide 106r, "R" is the radius of the ring waveguide 106r, "$m_1$" is a natural number, and "$\lambda$" is the wavelength of the light that causes the ring waveguide 106r to resonate (referred to as resonance wavelength). When the ring waveguide 106r resonates, all or a substantial portion of the energy of the light at resonance wavelength $\lambda$ is absorbed by the ring waveguide 106r and does not pass through the waveguide 108.

The ring waveguide 106r includes a p/n junction that is highly doped. For example, the dopant concentration may be around $4e^{18}/cm^3$ to $7e^{18}/cm^3$ in some embodiments. The p/n junction is biased or reverse-biased to a bias voltage through a Ring Modulator Driver (RMD) 116 (see FIG. 1). When the bias voltage changes, the free carrier density in the p/n junction also changes, which in turn changes the effective refractive index, $n_{eff}$, of the ring waveguide 106r. Thus, by changing the bias voltage, the ring waveguide 106r can be controlled to resonate at the resonance wavelength $\lambda$. In other words, the light at the wavelength $\lambda$ is modulated by applying a bias voltage to the ring waveguide 106r. In applications, the bias voltage can be digital data patterns (i.e., toggling between 0s and 1s). In the embodiment shown in FIG. 2, the p/n junction in the ring waveguide 106r has a height $H_1$ (such as about 200 nm) from a surface of a substrate and a width $W_1$ (such as about 370 nm), and the p-type doped material (such as silicon) and the n-type doped material (such as silicon) have a width $W_2$ (such as about 500 nm) and $W_3$ (such as about 500 nm), respectively.

Referring to FIG. 1, the optical receiver 202 includes a waveguide 208 for receiving a light signal carrying multiple wavelengths that are multiplexed and modulated (for example, as transmitted by the optical transmitter 102). As the light signal passes through the waveguide 208, different wavelengths of light are detected by RRs 206 (including $RR_1$, $RR_2$, ... $RR_n$) by way of resonance. The structure of the RR 206 is similar to that of the RM 106 except that the RR 206 includes a ring-shaped waveguide (for example, a silicon ring) 206r (see FIGS. 3-4) that is not a p/n junction. The RR 206 also resonates according to the equation EQ-1 above. When the RR 206 resonates, the energy of the light at the resonance wavelength $\lambda$ is absorbed by the RR 206 and is coupled to a waveguide 210, which in turn drives a photo detector 212 for converting a photonic signal to an electric signal. Subsequently, the electric signal is amplified by a transimpedance amplifier (TIA) 214 and processed by other circuitries not shown in FIG. 1.

In embodiments, the resonance wavelengths of the RMs 106 and RRs 206 are designed to match the wavelengths $\lambda_1$, $\lambda_2, \ldots \lambda_n$. However, due to manufacturing process variations and varying operating environment, the actual resonance wavelengths of the RMs 106 and RRs 206 may not exactly match the wavelengths $\lambda_1, \lambda_2, \ldots \lambda_n$ or a multiple thereof, and need to be tuned or corrected to the wavelengths $\lambda_1$, $\lambda_2, \ldots \lambda_n$ or a multiple thereof. In the present embodiment, the resonance wavelengths of the RMs 106 and RRs 206 are tuned by heaters 130 and 230 (FIGS. 2-4) that are coupled to each of RMs 106 and RRs 206.

Figure 4:
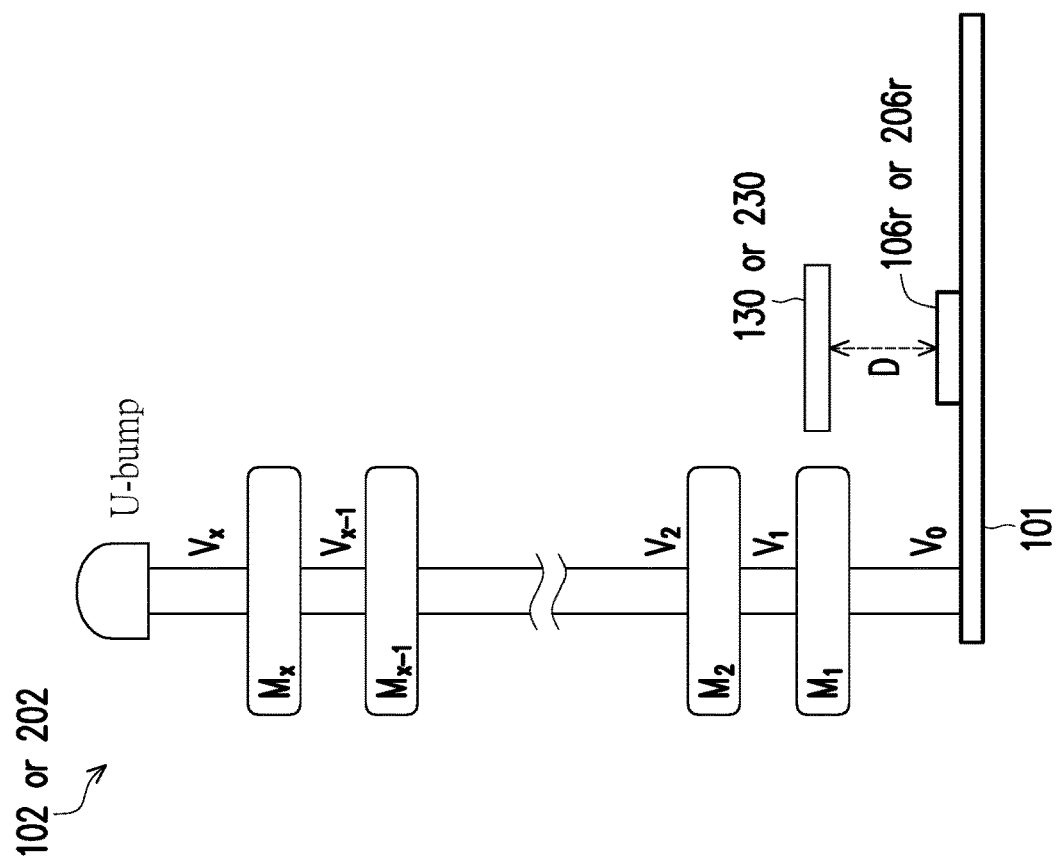
FIG. 4 illustrates a simplified cross-sectional view of a ring-shaped waveguide coupled with a heater used in the optical system in FIG. 1, according to embodiments of the present disclosure.
Figure 3:
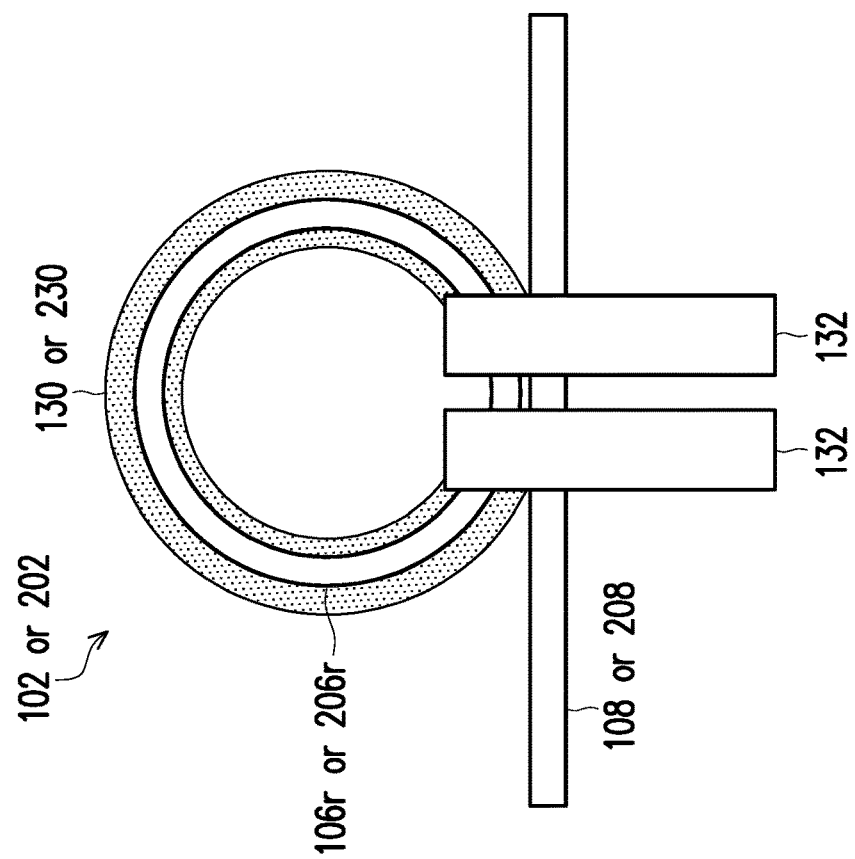
FIG. 3 illustrates a simplified top view of a ring-shaped waveguide coupled with a heater used in the optical system in FIG. 1, according to embodiments of the present disclosure.

Referring to FIGS. 3 and 4, shown therein are simplified schematic top view and cross-sectional view, respectively, of part of the optical transmitter 102 or the optical receiver 202. The optical transmitter 102 includes heaters 130 that are coupled to the ring-shaped waveguides 106r in one-to-one correspondence. The optical receiver 202 includes heaters 230 that are coupled to the ring-shaped waveguides 206r in one-to-one correspondence. The ring-shaped waveguides 106r and 206r are formed on a substrate 101 which may include a silicon wafer or other suitable material. The ring-shaped waveguides 106r and 206r may be formed on the same substrate (for example, to form an integrated optical transceiver) or on separate substrates (for example, to form individual optical transmitter and optical receiver). The heaters 130 and 230 may include metal heaters, silicon heaters, or other suitable heaters. The heaters 130 and 230 are disposed directly over the corresponding ring-shaped waveguides 106r and 206r and separated from the corresponding ring-shaped waveguides 106r and 206r by a vertical distance D. The distance D may be, for example, in a range of 0.7 μm to 0.9 μm in an embodiment. One or more dielectric materials (such as silicon oxide) may be filled in the space between the heaters 130 and 230 and the corresponding ring-shaped waveguides 106r and 206r. Each heater 130 and 230 is of a ring shape and is coupled to two electrodes 132 that supply electric current to the heater. The optical transmitter 102 and the optical receiver 202 further include metal wires (M1 through $M_x$), metal vias (V0 through $V_x$), and micro bumps (U-bump). The electrodes 132 are coupled to some of the micro bumps through the metal wires and metal vias. Further, the p/n junction of the ring-shaped waveguides 106r are coupled to some of the micro bumps through the metal wires and metal vias, which are in turn coupled to the RMDs 116 (FIG. 1).

Figure 5:
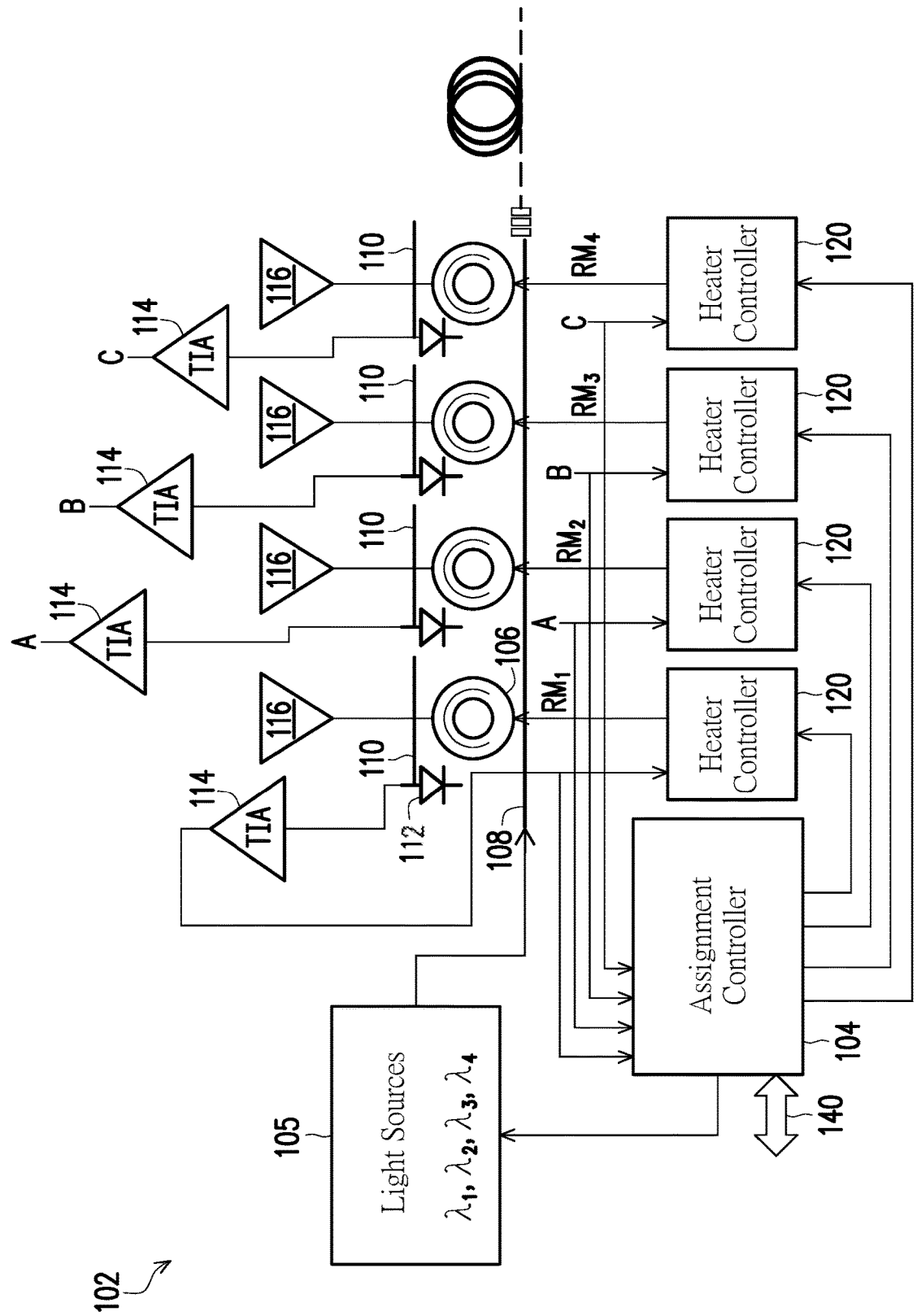
FIG. 5 illustrates a simplified diagram of an optical transmitter of the optical system in FIG. 1, according to embodiments of the present disclosure.

FIG. 5 illustrates an embodiment of the optical transmitter 102 constructed according to the present disclosure. For simplicity, the illustrated optical transmitter 102 includes 4 channels (corresponding to wavelengths $\lambda_1, \lambda_2, \lambda_3,$ and $\lambda_4$). However, the disclosed systems and methods are applicable to optical transmitters 102 having any number of channels, such as more than four channels or any multiple of four channels. The optical transmitter 102 includes four light sources (such as lasers) 105 that emit light at wavelengths $\lambda_1, \lambda_2, \lambda_3,$ and $\lambda_4$, respectively. The light at wavelengths $\lambda_1$, $\lambda_2, \lambda_3,$ and $\lambda_4$ are multiplexed and transmitted through the waveguide 108. The optical transmitter 102 includes four RMs 106, namely, $RM_1, RM_2, RM_3,$ and $RM_4$. The four RMs 106 are designed to resonate at the wavelengths $\lambda_1, \lambda_2$, $\lambda_3,$ and $\lambda_4$, respectively. However, the four RMs 106 may not resonate at the wavelengths $\lambda_1, \lambda_2, \lambda_3,$ and $\lambda_4$ due to process variations and varying operating environment.

The optical transmitter 102 further includes an assignment controller 104 that is operable to assign the wavelengths $\lambda_1$, $\lambda_2, \lambda_3,$ and $\lambda_4$ to the RMs 106 during system initialization. For example, the ring modulators, $RM_1, RM_2, RM_3,$ and $RM_4$ may be assigned with wavelengths $\lambda_1, \lambda_2, \lambda_3,$ and $\lambda_4$, respectively, or $\lambda_2, \lambda_3, \lambda_4,$ and $\lambda_1$, respectively, which will be further discussed with reference to FIG. 7.

The optical transmitter 102 further includes heaters 130 that are coupled to the RMs 106 (see FIGS. 2-4) and heater controllers 120 that are coupled to the heaters 130 in one-to-one correspondence. During system initialization, the assignment controller 104 controls the heater controllers 120 which in turn control the heaters 130. Once the assignment is completed, the heater controllers 120 control the heaters 130 to finely tune (or automatically correct) the resonance wavelengths of the RMs 106 without the intervention of the assignment controller 104.

The optical transmitter 102 further includes waveguides 110, photo detectors (such as photodiodes) 112, and TIAs 114. In one-to-one correspondence, the waveguides 110 are coupled to the RMs 106, and the photo detectors 112 are coupled between the waveguides 110 and the TIAs 114. The outputs of the TIAs 114 are coupled to the heater controllers 120 and the assignment controller 104. Once the RMs 106 resonate, light signal is coupled to the corresponding waveguides 110. Subsequently, the photo detectors 112 convert the light signals to electric signals, which are then amplified by the TIAs 114. The amplified electric signals are used by the assignment controller 104 for channel assignment during system initialization and by the heater controller 120 for auto-correction during the system's run time. The optical transmitter 102 further includes a bus 140 for interconnecting the assignment controller 104 with other components of the optical transmitter 102, such as memory. Each heater controller 120 may include comparators and/or other suitable digital or analog circuits. The optical transmitter 102 further includes RMDs 116 for biasing the p/n junctions in the RMs 106.

Figure 6:
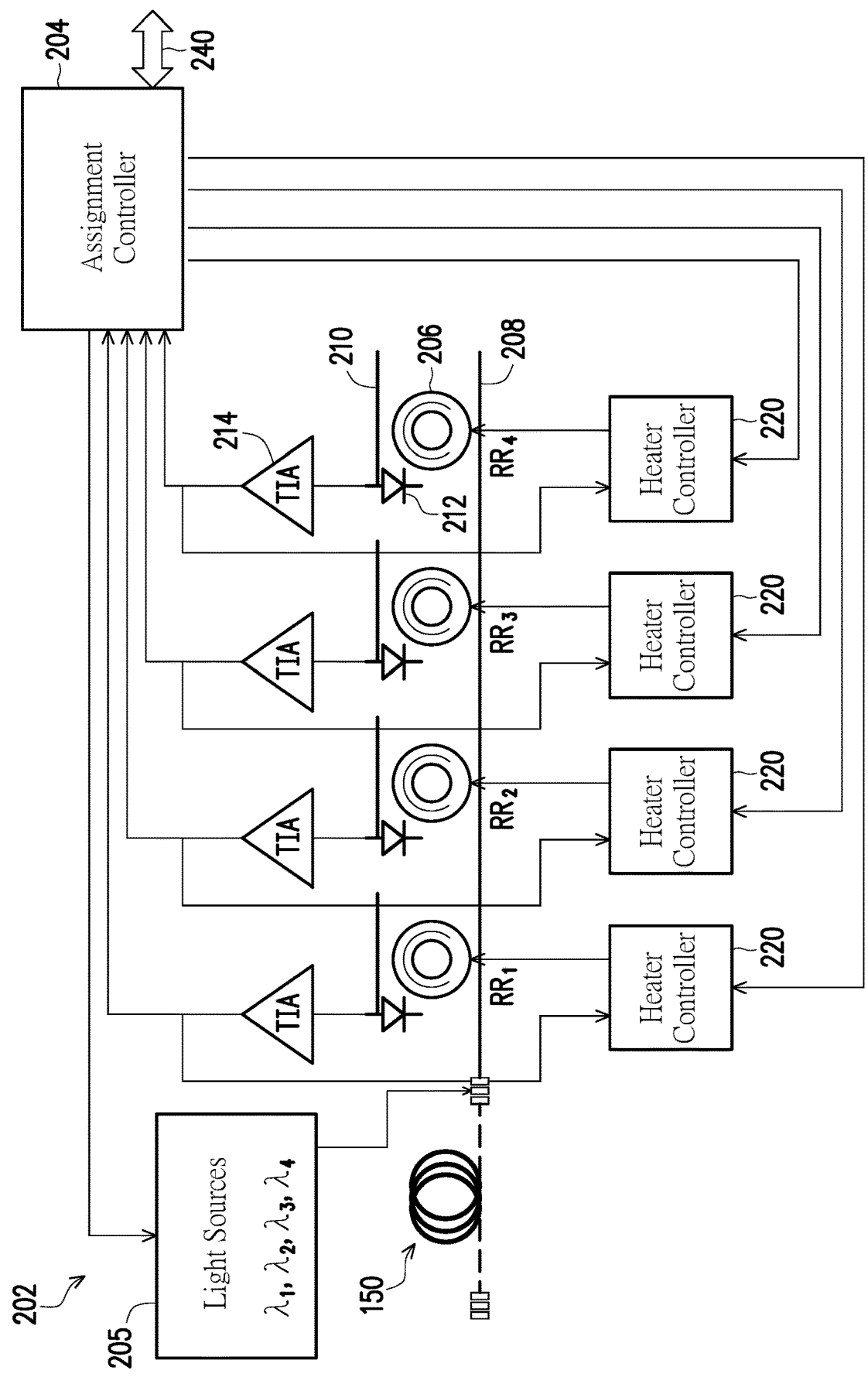
FIG. 6 illustrates a simplified diagram of an optical receiver of the optical system in FIG. 1, according to embodiments of the present disclosure.

FIG. 6 illustrates an embodiment of the optical receiver 202 constructed according to the present disclosure. For simplicity, the illustrated optical receiver 202 includes 4 channels (corresponding to wavelengths $\lambda_1, \lambda_2, \lambda_3,$ and $\lambda_4$). However, the disclosed systems and methods are applicable to optical receiver 202 having any number of channels, such as more than four channels or a multiple of four channels. The optical receiver 202 includes four light sources (such as lasers) 205 that emit light at wavelengths $\lambda_1, \lambda_2, \lambda_3,$ and $\lambda_4$, respectively. The optical receiver 202 includes a waveguide 208. During system initialization, the waveguide 208 receives light signals from the light sources 205. During system's run time, the waveguide 208 receives light signals from an optical transmitter, such as the optical transmitter 102, through optical fiber 150. The optical receiver 202 includes four RRs 206, namely, $RR_1, RR_2, RR_3,$ and $RR_4$. The four RRs 206 are designed to resonate at the wavelengths $\lambda_1, \lambda_2, \lambda_3,$ and $\lambda_4$, respectively. However, the four RRs 206 may not resonate at the wavelengths $\lambda_1, \lambda_2, \lambda_3,$ and $\lambda_4$ due to process variations and varying operating environment.

The optical receiver 202 further includes an assignment controller 204 that is operable to assign the wavelengths $\lambda_1$, $\lambda_2, \lambda_3,$ and $\lambda_4$ to the RRs 206 during system initialization. For example, the ring resonators, $RR_1, RR_2, RR_3,$ and $RR_4$ may be assigned with wavelengths $\lambda_1, \lambda_2, \lambda_3,$ and $\lambda_4$, respectively, or $\lambda_2, \lambda_3, \lambda_4,$ and $\lambda_1$, respectively, which will be further discussed with reference to FIG. 7.

The optical receiver 202 further includes heaters 230 that are coupled to the RRs 206 (see FIGS. 3-4) and heater controllers 220 that are coupled to the heaters 230 in one-to-one correspondence. During system initialization, the assignment controller 204 controls the heater controllers 220 which in turn control the heaters 230. Once the assignment is completed, the heater controllers 220 control the heaters 230 to finely tune (or automatically correct) the resonance wavelengths of the RRs 206 without the intervention of the assignment controller 204.

The optical receiver 202 further includes waveguides 210, photo detectors (such as photodiodes) 212, and TIAs 214. In one-to-one correspondence, the waveguides 210 are coupled to the RRs 206 and the photo detectors 212 are coupled between the waveguides 210 and the TIAs 214. The outputs of TIAs 214 are coupled to heater controllers 220 and the assignment controller 204. Once the RRs 206 resonate, light signal is coupled to the corresponding waveguides 210. Subsequently, the photo detectors 212 convert the light signals to electric signals, which are then amplified by the TIAs 214. The amplified electric signals are used by the assignment controller 204 for channel assignment during system initialization and by the heater controller 220 for auto-correction during system's run time. The optical receiver 202 further includes a bus 240 for interconnecting the assignment controller 204 with other components of the optical receiver 202, such as memory. Each heater controller 220 may include comparators and/or other suitable digital or analog circuits.

Each of the assignment controllers 104 and 204 may be implemented in hardware, software, or a combination thereof. Suitable hardware may include one or more general-purpose processing devices such as a microprocessor, central processing unit, or the like, or one or more special-purpose processing devices such as an application specific integrated circuit (ASIC), a field programmable gate array (FPGA), a digital signal processor (DSP), network processor, or the like. The hardware is configured to execute instructions for performing the operations and steps discussed herein. Suitable software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server. Combinations of software and hardware could also be used for providing enhanced functionality and performance for certain embodiments of the present disclosure. One example is to directly manufacture software functions into a silicon chip.

Figure 7:
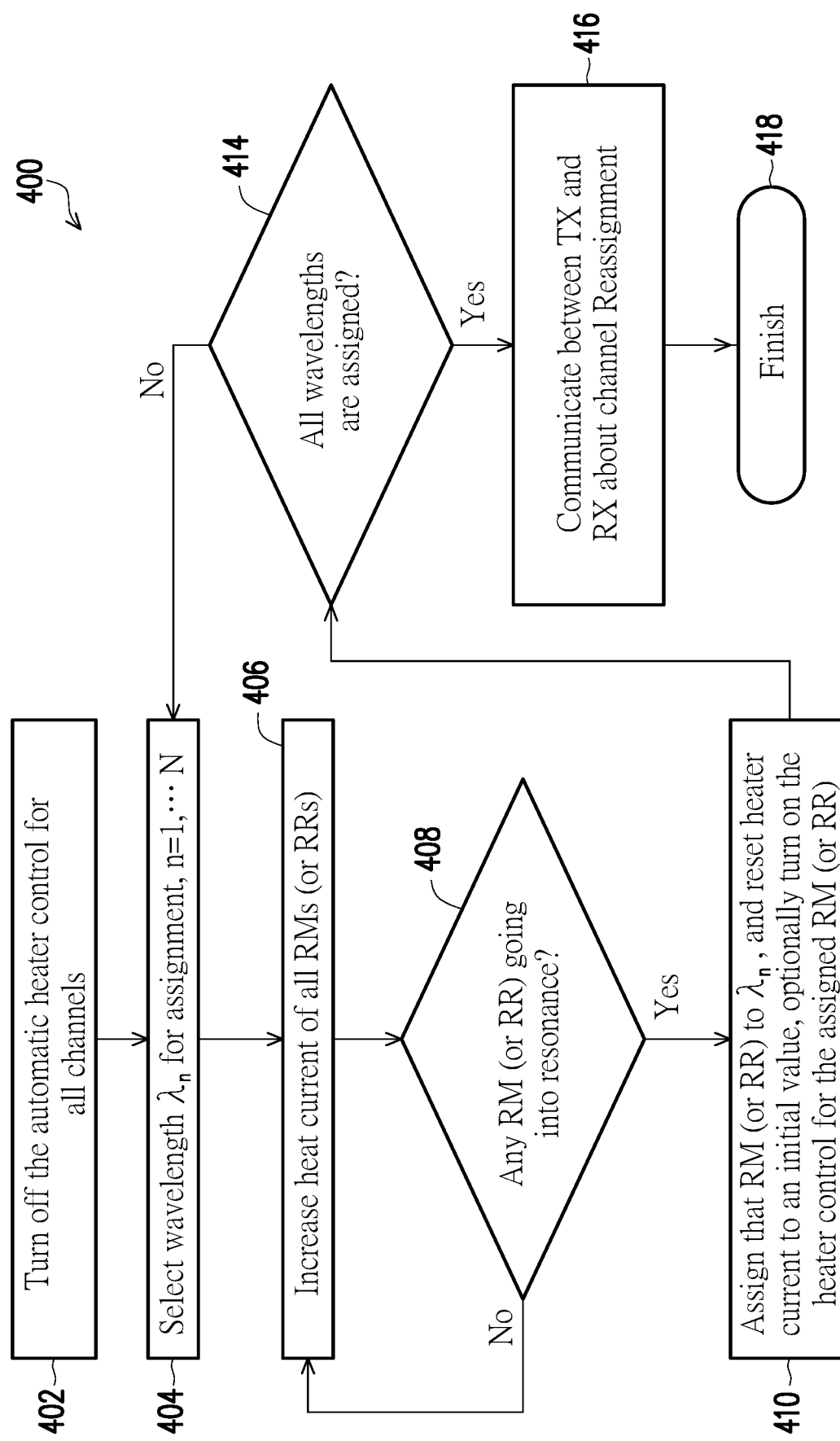
FIG. 7 illustrates a flow chart of a method implemented in the dynamic channel assignment in the optical system in FIG. 1, according to embodiments of the present disclosure.
Figure 8:
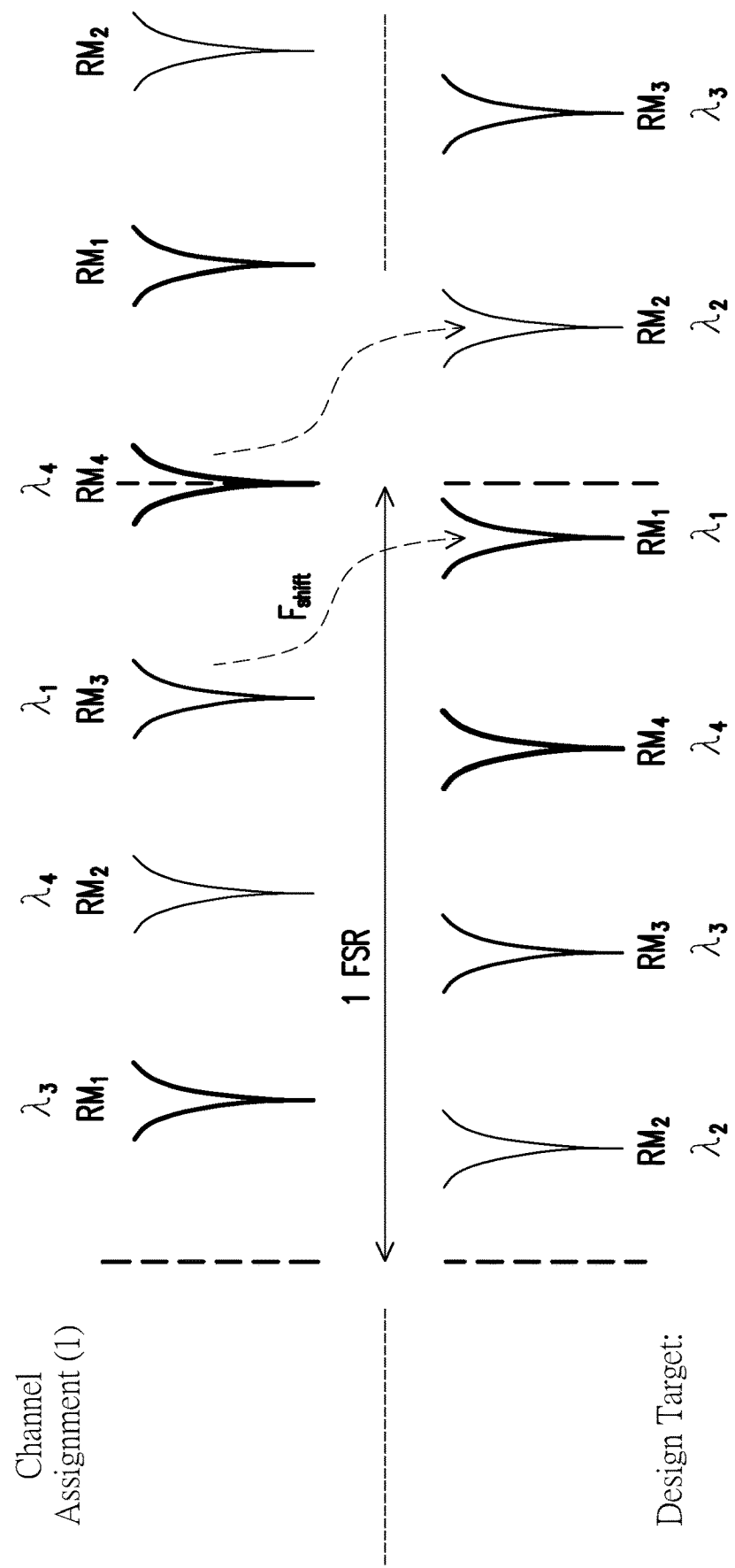
FIG. 8 illustrates an example channel assignment produced by the dynamic channel assignment in the optical system in FIG. 1, according to embodiments of the present disclosure.

FIG. 7 illustrates a flow chart of a method 400 that may be implemented in the assignment controllers 104 and 204. The method 400 includes operations 402, 404, 406, 408, 410, 414, 416, and 418. Additional operations are contemplated by the present disclosure. Additional operations can be provided before, during, and after method 400, and some of the operations described can be moved, replaced, or eliminated for additional embodiments of method 400. Method 400 is described below in conjunction with FIG. 5 for operations of the assignment controller 104. FIG. 8 illustrates an example channel assignment produced by method 400.

At operation 402, the assignment controller 104 turns off automatic heater control for all channels in the optical transmitter 102. For example, the assignment controller 104 configures the heater controllers 120 such that the heater controllers 120 ignore the input(s) from the TIA 114. Further, each of the heaters 130 is supplied with an initial electric current, for example, an electric current that is substantially zero (0) ampere. As illustrated in FIG. 8 (lower half), the ring modulators $RM_1$, $RM_2$, $RM_3$, and $RM_4$ are designed to resonate at wavelengths $\lambda_1$, $\lambda_2$, $\lambda_3$, and $\lambda_4$, respectively.

At operation 404, the assignment controller 104 configures the light sources 105 to emit light at a selected wavelength, such as wavelength $\lambda_1$ or any one of the wavelengths $\lambda_1$, $\lambda_2$, $\lambda_3$, and $\lambda_4$. For example, the assignment controller 104 may turn on one of the light sources 105 that emits light at the selected wavelength and turn off other light sources 105. Then, the light emitted by the selected light source 105 is coupled into the waveguide 108.

At operation 406, the assignment controller 104 instructs all the heater controllers 120 to increase electric current supplied to the corresponding heaters 130 by a step $\Delta I$. For example, the step $\Delta I$ may be in a range of 1 µA to 5 µA. Alternatively, the assignment controller 104 instructs all the heater controllers 120 excluding any heater controllers 120 that correspond to RMs 106 that have been assigned with wavelengths (such as in subsequent assignment), to increase electric current supplied to the corresponding heaters 130 by a step $\Delta I$.

At operation 408, the assignment controller 104 checks to see if any of the RMs 106 resonates. For example, if the signal amplitude from the TIAs 114 exceeds certain threshold, then the corresponding RM 106 is determined to be in resonance.

If none of the RMs 106 resonates, the method 400 returns to operation 406 to further increase the electric current supplied to the heaters 130 and then proceeds to operation 408. This continues until one of the RMs 106 resonates. For this illustration, assume that $RM_3$ resonates with the selected wavelength $\lambda_1$. Then, the method 400 proceeds to operation 410.

At operation 410, the assignment controller 104 assigns the resonating RM 106 with the selected wavelength. For illustration, $RM_3$ is assigned with wavelength which is different than the designed resonance wavelength $\lambda_3$. Then, the assignment controller 104 resets all the heater controllers 120 so that the heaters 130 are supplied with the initial electric current. In an alternative embodiment, the assignment controller 104 only resets the heater controllers 120 that correspond to the unassigned RMs 106 ($RM_1$, $RM_2$, and $RM_4$ in this illustration), and enables the automatic heater control for the assigned RM 106 ($RM_3$ in this illustration). In the alternative embodiment, the assignment for $RM_3$ has been completed, and $RM_3$ is finely tuned by the heater controller 120 through the automatic heater control loop having $RM_3$, waveguide 110, photo detector 112, TIA 114, and the heater controller 120.

Then, the method 400 proceeds to operation 414 to check if all wavelengths have been assigned. If all wavelengths have been assigned, the method 400 proceeds to operation 416. Otherwise, the method 400 proceeds to operation 404 to select next wavelength for assignment. For illustration purposes, the next wavelength is $\lambda_2$. The operation 404 turns on the light source for wavelength $\lambda_2$ only.

Then, the method 400 repeats operations 406 and 408 until one of the RMs 106 resonates. For illustration purposes, assume that $RM_4$ resonates with the selected wavelength $\lambda_2$. Then, at operation 410, the assignment controller 104 assigns $RM_4$ with wavelength $\lambda_2$. Further, the assignment controller 104 resets all the heater controllers 120 so that the heaters 130 are supplied with the initial electric current. In an alternative embodiment, the assignment controller 104 only resets the heater controllers 120 that correspond to the unassigned RMs 106 ($RM_1$ and $RM_2$ in this illustration) and enables the automatic heater control for the assigned RMs 106 (RM$_3$ and RM$_4$ in this illustration).

Then, the method 400 proceeds to operation 414, 404, 406, 408, and 410 to assign remaining wavelengths to the RMs 106. For illustration purposes, the ring modulators RM$_1$ and RM$_2$ are assigned with wavelengths $\lambda_3$ and $\lambda_4$, respectively in the next two loops. In the above example, the wavelengths are selected in an ascending order, i.e., from $\lambda_1$ to $\lambda_4$. Alternatively, the wavelengths may be selected in a descending order or in a random order.

When all wavelengths have been assigned (operation 414), the method 400 proceeds to operation 416. At operation 416, the method 400 communicates the assignment of the channels (i.e., how the RMs 106 correspond to the wavelengths $\lambda_1$ through $\lambda_4$) to an optical receiver that is expected to receive the light signal from the optical transmitter 102.

At operation 418, the method 400 finishes the assignment and may store certain results of the assignment to memory. For example, the method 400 may store the values of the electric current at which the RMs 106 resonate during the assignment. These values may be used in future assignment to speed up the assignment process. For another example, the method 400 may store the results of assignment. Further, the method 400 may start the operation of the optical transmitter 102. For example, the method 400 may modulate the wavelengths $\lambda_1$ through $\lambda_4$ by applying electric signals to the RMDs 116, respectively, thereby generating modulated light signals. These modulated light signals are multiplexed and transmitted through optical fiber 150. The RMDs 116 may be set to a fixed or a toggling biasing voltage during the operations 402 through 418 until the operation of the optical transmitter 102 starts.

Embodiments of the method 400 are also applicable to the assignment controller 204 in the optical receiver 202. Below is a brief description of such embodiments by reference to FIGS. 6-8.

At operation 402, the assignment controller 204 turns off automatic heater control for all channels in the optical receiver 202. For example, the assignment controller 204 configures the heater controllers 220 such that the heater controllers 220 ignore the input(s) from the TIA 214. Further, each of the heaters 230 is supplied with an initial electric current, for example, an electric current that is substantially zero (0) ampere. The ring resonators 206, namely RR$_1$, RR$_2$, RR$_3$, and RR$_4$, are designed to resonate at wavelengths $\lambda_1$, $\lambda_2$, $\lambda_3$, and $\lambda_4$, respectively.

At operation 404, the assignment controller 204 configures the light sources 205 to emit light at a selected wavelength, such as wavelength $\lambda_1$ or any one of the wavelengths $\lambda_1$, $\lambda_2$, $\lambda_3$, and $\lambda_4$. For example, the assignment controller 204 may turn on one of the light sources 205 that emits light at the selected wavelength and turn off other light sources 205. In an embodiment, the light sources 205 are only used during the initialization of the optical receiver 202. For this illustration, assume that the wavelength $\lambda_1$ is selected.

At operation 406, the assignment controller 204 instructs all the heater controllers 220 to increase electric current supplied to the corresponding heaters 230 by a step $\Delta I$. For example, the step $\Delta I$ may be in a range of 1 µA to 5 µA.

At operation 408, the assignment controller 204 checks to see if any of the RRs 206 resonates. For example, if the signal amplitude from the TIAs 214 exceeds certain threshold, then the corresponding RR 206 is determined to be in resonance.

If none of the RRs 206 resonates, the method 400 returns to operation 406 to further increase the electric current supplied to the heaters 230 and then proceeds to operation 408. This continues until one of the RRs 206 resonates. For illustration purposes, assume that RR$_3$ resonates with the selected wavelength $\lambda_1$. Then, the method 400 proceeds to operation 410.

At operation 410, the assignment controller 204 assigns the resonating RR 206 with the selected wavelength. For this illustration, RR$_3$ is assigned with wavelength $\lambda_1$. Then, the assignment controller 204 resets all the heater controllers 220 so that the heaters 230 are supplied with the initial electric current. In an alternative embodiment, the assignment controller 204 only resets the heater controllers 220 that correspond to the unassigned RRs 206 (RR$_1$, RR$_2$, and RR$_4$ in this illustration), and enables the automatic heater control for the assigned RRs 206 (RR$_3$ in this illustration). For example, the RR$_3$ is finely tuned by the heater controller 220 through the loop having RR$_3$, waveguide 210, photo detector 212, TIA 214, and the heater controller 220.

Then, the method 400 proceeds to operation 414 to check if all wavelengths have been assigned. If all wavelengths have been assigned, then the method 400 proceeds to operation 416. Otherwise, the method 400 proceeds to operation 404 to start a new assignment.

In the new assignment, the method 400 performs the operation 404 so that only the light source 205 for the next selected wavelength, such as wavelength $\lambda_2$, is turned on. Then, the method 400 repeats operations 406 and 408 until one of the RRs 206 resonates. For illustration purposes, assume that RR$_4$ resonates with the selected wavelength $\lambda_2$. Then, at operation 410, the assignment controller 204 assigns RR$_4$ with wavelength $\lambda_2$. Further, the assignment controller 204 resets all the heater controllers 220 so that the heaters 230 are supplied with the initial electric current. In an alternative embodiment, the assignment controller 204 only resets the heater controllers 220 that correspond to the unassigned RRs 206 (RR$_1$ and RR$_2$ in this illustration) and enables the automatic heater control for the assigned RRs 206 (RR$_3$ and RR$_4$ in this illustration).

Then, the method 400 proceeds to operation 414, 404, 406, 408, and 410 to assign remaining wavelengths to the RRs 206. For illustration purposes, the ring resonators RR$_1$ and RR$_2$ are assigned with wavelengths $\lambda_3$ and $\lambda_4$, respectively in the next two loops. In the above example, the wavelengths are selected in an ascending order, i.e., from $\lambda_1$ to $\lambda_4$. Alternatively, the wavelengths may be selected in a descending order or in a random order.

When all wavelengths have been assigned (operation 414), the method 400 proceeds to operation 416. At operation 416, the method 400 communicates the assignment of the channels (i.e., how the RRs 206 correspond to the wavelengths $\lambda_1$ through $\lambda_4$) to an optical transmitter that is expected to transmit the light signal to the optical receiver 202.

At operation 418, the method 400 finishes the assignment and may store certain results of the assignment to memory. For example, the method 400 may store the values of the electric current at which the RRs 206 resonate during the assignment. These values may be used in future assignment to speed up the assignment process. Further, the method 400 may start the operation of the optical receiver 202. For example, the method 400 may receive a light signal through optical fiber 150 where the light signal has components at the wavelengths $\lambda_1$ through $\lambda_4$ that are modulated with respective digital data patterns. The light signal is coupled to the RRs 206 as it passes through the waveguide 208. The RRs 206 then resonate at their assigned wavelengths, thereby demultiplexing the light signal into individual light signals at the assigned wavelengths. The individual light signals are coupled to the waveguides 210. The electric signals carried by the individual light signals are detected by the photo detectors 212 and processed by the TIAs 214 and other circuits.

Although not intended to be limiting, one or more embodiments of the present disclosure provide many benefits to optical systems, such as DWDM systems. Some advantages of the present disclosure can be understood by contrasting the assignment in FIG. 8 with that in FIG. 9. As illustrated in the lower half of FIGS. 8 and 9, the ring modulators (or ring resonators) are designed to resonate at wavelengths $\lambda_1$, $\lambda_2$, $\lambda_3$, and $\lambda_4$, respectively. Due to manufacturing process variations and different operating environment, the actual resonance frequencies of the ring modulators and ring resonators are shifted from their designed values by $F_{shift}$. In the illustrated example, the frequency shift, $F_{shift}$, is about 75% of one FSR (see FIG. 9). In some instances, the frequency shift, $F_{shift}$, may be close to one FSR. Using heaters to compensate for such large frequency shift may be impossible or may introduce reliability issues, as discussed earlier. In contrast, by using embodiments of the present disclosure, the heaters only need to compensate for a relatively smaller frequency shift $F_{assign}$, as illustrated in FIG. 8. This is because for any selected wavelength, the ring modulator or ring resonator whose actual resonance wavelength is the closest to the selected wavelength is assigned with the selected wavelength. Therefore, the frequency shift $F_{assign}$ represents the smallest frequency shift that the ring modulator or ring resonator needs to have in order to resonate for the operations of the optical system. In the example illustrated in FIG. 8, the frequency shift $F_{assign}$ is less than 25% of one FSR, which is much less than the frequency shift, $F_{shift}$. Advantageously, the heaters can be made smaller and/or more efficient, and the power consumption of the optical system can be reduced.

In an example aspect, the present disclosure is directed to a method for operating an optical device, wherein the optical device includes a first waveguide, multiple ring-shaped waveguides adjacent to the first waveguide, and multiple heaters coupled to the ring-shaped waveguides in one-to-one correspondence, wherein each of the multiple heaters is supplied with an initial electric current. The method includes coupling a first light source with a first wavelength to the first waveguide and increasing electric current through the heaters until a first one of the ring-shaped waveguides resonates, wherein the first one of the ring-shaped waveguides is coupled to a first one of the heaters. The method further includes assigning the first one of the ring-shaped waveguides to the first wavelength and resetting the electric current through the heaters or the heaters excluding the first one of the heaters to the initial electric current. The method further includes coupling a second light source with a second wavelength to the first waveguide wherein the second wavelength is different from the first wavelength. The method further includes increasing the electric current through the heaters or the heaters excluding the first one of the heaters until a second one of the ring-shaped waveguides resonates wherein the second one of the ring-shaped waveguides is different from the first one of the ring-shaped waveguides and assigning the second one of the ring-shaped waveguides to the second wavelength.

In an embodiment of the method, the initial electric current is substantially zero amperes. In an embodiment where the optical device includes multiple heater control loops that are configured to control the multiple heaters in one-to-one correspondence, the method further includes disabling the heater control loops before the coupling of the first light source and enabling one of the heater control loops that corresponds to the first one of the heaters after the assigning of the first one of the ring-shaped waveguides to the first wavelength.

In an embodiment of the method, the multiple ring-shaped waveguides include four or more ring-shaped waveguides. In another embodiment, the optical device includes an optical transmitter and each of the ring-shaped waveguides is a part of a micro-ring modulator. In a further embodiment, after the assigning of the second one of the ring-shaped waveguides to the second wavelength, the method further includes modulating the first wavelength by applying a first electric signal to the first one of the ring-shaped waveguides, thereby generating a modulated first light signal; modulating the second wavelength by applying a second electric signal to the second one of the ring-shaped waveguides, thereby generating a modulated second light signal; and multiplexing the modulated first light signal and the modulated second light signal into a transmitting light signal.

In an embodiment of the method, the optical device includes an optical receiver and each of the ring-shaped waveguides is a part of a ring resonator. In a further embodiment, after the assigning of the second one of the ring-shaped waveguides to the second wavelength, the method further includes receiving a light signal having a first component at the first wavelength and a second component at the second wavelength; coupling the light signal to the multiple ring-shaped waveguides; and demultiplexing the light signal to a first light signal through the first one of the ring-shaped waveguides and a second light signal through the second one of the ring-shaped waveguides.

In another example aspect, the present disclosure is directed to a method for operating an optical transmitter, wherein the optical transmitter includes a first waveguide, multiple micro-ring modulators (MRMs) adjacent to the first waveguide, and multiple heaters coupled to the MRMs in one-to-one correspondence, wherein each of the multiple heaters is supplied with an initial electric current. The method includes the steps of coupling a light source with a wavelength to the first waveguide; increasing electric current through each of the heaters until one of the MRMs resonates, wherein the one of the MRMs is coupled to one of the heaters; assigning the one of the MRMs to the wavelength; resetting the electric current through the heaters or the heaters excluding the one of the heaters to the initial electric current; and repeating the steps of coupling, increasing, assigning, and resetting until each of the MRMs is assigned to a different wavelength.

In an embodiment, before the step of coupling, the method further includes turning off an automatic heater control loop to each of the multiple heaters. In another embodiment, the MRMs include a multiple of four MRMs. In yet another embodiment, the method further includes biasing each of the MRMs to a fixed biasing voltage during the steps of coupling, increasing, assigning, resetting, and repeating.

In an embodiment, the method further includes applying a toggling electric signal to each of the MRMs during the steps of coupling, increasing, assigning, resetting, and repeating. In another embodiment, the method further includes storing values of electric current through each of the heaters that cause the respective MRMs to resonate during the step of increasing electric current. In yet another embodiment, the steps of coupling, increasing, assigning, resetting, and repeating are performed during an initialization procedure of the optical transmitter.

In yet another example aspect, the present disclosure is directed to a system that includes an optical transmitter, wherein the optical transmitter includes a first waveguide, multiple micro-ring modulators (MRMs) disposed adjacent to the first waveguide, and multiple heaters coupled to the MRMs in one-to-one correspondence. The system further includes multiple heater controllers coupled to the multiple heaters in one-to-one correspondence and an assignment controller that is configured to perform coupling a light source to the first waveguide; instructing the heater controllers to increase electric current through the heaters until one of the MRMs resonates, wherein the one of the MRMs is coupled to one of the heaters; and assigning the one of the MRMs to a wavelength of the light source.

In an embodiment, the assignment controller is further configured to perform resetting the electric current through the heaters or the heaters excluding the one of the heaters to an initial electric current and repeating the steps of coupling, instructing, and resetting until each of the MRMs is assigned to a different wavelength. In a further embodiment, the assignment controller is further configured to perform storing results of assigning the MRMs to the different wavelengths.

In an embodiment of the system, the optical transmitter further includes multiple ring modulator drivers (RMDs) that are coupled to the MRMs in one-to-one correspondence. In another embodiment of the system, the optical transmitter further includes multiple photo detectors, and each of the photo detectors is coupled between one of the MRMs and a corresponding one of the heater controllers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for operating an optical device, wherein the optical device includes a first waveguide, multiple ring-shaped waveguides adjacent to the first waveguide, and multiple heaters coupled to the ring-shaped waveguides in one-to-one correspondence, wherein each of the multiple heaters is supplied with an initial electric current, the method comprising:
    coupling a first light source with a first wavelength to the first waveguide;
    increasing electric current through the heaters until a first one of the ring-shaped waveguides resonates, wherein the first one of the ring-shaped waveguides is coupled to a first one of the heaters;
    assigning the first one of the ring-shaped waveguides to the first wavelength;
    resetting the electric current through the heaters or the heaters excluding the first one of the heaters to the initial electric current;
    coupling a second light source with a second wavelength to the first waveguide, wherein the second wavelength is different from the first wavelength;
    increasing the electric current through the heaters or the heaters excluding the first one of the heaters until a second one of the ring-shaped waveguides resonates, wherein the second one of the ring-shaped waveguides is different from the first one of the ring-shaped waveguides; and
    assigning the second one of the ring-shaped waveguides to the second wavelength.

2. The method of claim 1, wherein the initial electric current is substantially zero amperes.

3. The method of claim 1, wherein the optical device includes multiple heater control loops that are configured to control the multiple heaters in one-to-one correspondence, further comprising:
    before the coupling of the first light source, disabling the heater control loops; and
    after the assigning of the first one of the ring-shaped waveguides to the first wavelength, enabling one of the heater control loops that corresponds to the first one of the heaters.

4. The method of claim 1, wherein the multiple ring-shaped waveguides include four or more ring-shaped waveguides.

5. The method of claim 1, wherein the optical device includes an optical transmitter and each of the ring-shaped waveguides is a part of a micro-ring modulator.

6. The method of claim 5, after the assigning of the second one of the ring-shaped waveguides to the second wavelength, further comprising:
    modulating the first wavelength by applying a first electric signal to the first one of the ring-shaped waveguides, thereby generating a modulated first light signal;
    modulating the second wavelength by applying a second electric signal to the second one of the ring-shaped waveguides, thereby generating a modulated second light signal; and
    multiplexing the modulated first light signal and the modulated second light signal into a transmitting light signal.

7. The method of claim 1, wherein the optical device includes an optical receiver and each of the ring-shaped waveguides is a part of a ring resonator.

8. The method of claim 7, after the assigning of the second one of the ring-shaped waveguides to the second wavelength, further comprising:
    receiving a light signal having a first component at the first wavelength and a second component at the second wavelength;
    coupling the light signal to the multiple ring-shaped waveguides; and
    demultiplexing the light signal to a first light signal through the first one of the ring-shaped waveguides and a second light signal through the second one of the ring-shaped waveguides.

9. A method for operating an optical transmitter, wherein the optical transmitter includes a first waveguide, multiple micro-ring modulators (MRMs) adjacent to the first waveguide, and multiple heaters coupled to the MRMs in one-to-one correspondence, wherein each of the multiple heaters is supplied with an initial electric current, the method comprising the steps of:
    coupling a light source with a wavelength to the first waveguide;
    increasing electric current through each of the heaters until one of the MRMs resonates, wherein the one of the MRMs is coupled to one of the heaters;

assigning the one of the MRMs to the wavelength;
resetting the electric current through the heaters or the heaters excluding the one of the heaters to the initial electric current; and
repeating the steps of coupling, increasing, assigning, and resetting until each of the MRMs is assigned to a different wavelength.

10. The method of claim 9, before the step of coupling, further comprising:
turning off an automatic heater control loop to each of the multiple heaters.

11. The method of claim 9, wherein the MRMs include a multiple of four MRMs.

12. The method of claim 9, further comprising:
biasing each of the MRMs to a fixed biasing voltage during the steps of coupling, increasing, assigning, resetting, and repeating.

13. The method of claim 9, further comprising:
applying a toggling electric signal to each of the MRMs during the steps of coupling, increasing, assigning, resetting, and repeating.

14. The method of claim 9, further comprising:
storing values of electric current through each of the heaters that cause the respective MRMs to resonate during the step of increasing electric current.

15. The method of claim 9, wherein the steps of coupling, increasing, assigning, resetting, and repeating are performed during an initialization procedure of the optical transmitter.

16. A system comprising:
an optical transmitter, wherein the optical transmitter includes a first waveguide, multiple micro-ring modulators (MRMs) disposed adjacent to the first waveguide, and multiple heaters coupled to the MRMs in one-to-one correspondence;
multiple heater controllers coupled to the multiple heaters in one-to-one correspondence; and
an assignment controller that is configured to perform:
coupling a light source to the first waveguide;
instructing the heater controllers to increase electric current through the heaters until one of the MRMs resonates, wherein the one of the MRMs is coupled to one of the heaters; and
assigning the one of the MRMs to a wavelength of the light source.

17. The system of claim 16, wherein the assignment controller is further configured to perform:
resetting the electric current through the heaters or the heaters excluding the one of the heaters to an initial electric current; and
repeating the steps of coupling, instructing, and resetting until each of the MRMs is assigned to a different wavelength.

18. The system of claim 17, wherein the assignment controller is further configured to perform:
storing results of assigning the MRMs to the different wavelengths.

19. The system of claim 16, wherein the optical transmitter further includes multiple ring modulator drivers (RMDs) that are coupled to the MRMs in one-to-one correspondence.

20. The system of claim 16, wherein the optical transmitter further includes multiple photo detectors, and each of the photo detectors is coupled between one of the MRMs and a corresponding one of the heater controllers.

* * * * *